(12) United States Patent
Giles et al.

(10) Patent No.: US 10,379,994 B1
(45) Date of Patent: Aug. 13, 2019

(54) METHODS AND SYSTEMS FOR SMART CODE SCANNING, ANALYSIS AND REPORTING

(71) Applicant: Amazon Technologies, Inc., Seattle, WA (US)

(72) Inventors: Sarah Giles, Kirkland, WA (US); Addison Page Phillips, San Jose, CA (US); Kuldeep Sharma, Seattle, WA (US); Ajay Kumar Soni, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/421,367

(22) Filed: Jan. 31, 2017

(51) Int. Cl.
  *G06F 11/00* (2006.01)
  *G06F 11/36* (2006.01)

(52) U.S. Cl.
  CPC .......... *G06F 11/3604* (2013.01); *G06F 11/00* (2013.01); *G06F 11/36* (2013.01); *G06F 11/362* (2013.01); *G06F 11/3664* (2013.01)

(58) Field of Classification Search
  None
  See application file for complete search history.

(56) References Cited

U.S. PATENT DOCUMENTS

| | | | | |
|---|---|---|---|---|
| 8,806,441 | B2* | 8/2014 | Chandra | G06F 8/75 717/126 |
| 9,104,878 | B1* | 8/2015 | Khairetdinov | G06F 21/577 |
| 2015/0011187 | A1* | 1/2015 | Wetzold | H04W 4/02 455/411 |
| 2016/0182558 | A1* | 6/2016 | Tripp | H04L 63/1433 726/25 |
| 2017/0237820 | A1* | 8/2017 | Scarborough | G06Q 20/3224 709/226 |

* cited by examiner

*Primary Examiner* — Francisco J Aponte
*Assistant Examiner* — Mark A Gooray
(74) *Attorney, Agent, or Firm* — Eversheds Sutherland (US) LLP

(57) ABSTRACT

Systems, methods, and computer-readable media are disclosed for smart code scanning, analysis and reporting. The systems, methods, and computer-readable media described herein may reduce the computational load on the scanner service and improve user experiences. In an example method described herein, a scanning service may receive code for analysis, the code being associated with a first project identifier. The scanner service may scan the code to identify one or more potential issues associated with the code. In turn, the scanner service may provide a list comprising, at least, one or more potential issues for display at a user device. The scanner service may then receive data indicative of a first potential issue being a false positive based on, at least in part, user input. The scanner service may determine, based on the first potential issue being a false positive, a first set of one or more rules for filtering the one or more potential issues, wherein the first set of one or more rules comprises a first rule. The scanner service may store and automatically apply the first set of rules.

20 Claims, 10 Drawing Sheets

METHODS AND SYSTEMS FOR SMART CODE SCANNING, ANALYSIS AND REPORTING

BACKGROUND

The internet has transformed ways in which people communicate. A variety of services may utilize the internet to provide consumers with promotions, products, services and/or experiences. For example, a code analysis service may allow users to provide code via the internet for analysis. During such analysis, the service may determine issues or potential issues within the code and report these issues to the user. However, in many occasions, the identified issues or potential issues may correspond to a false positive. For example, some of the reported issues or potential issues may not be issues of concern to a particular client. These false positive results may make the scanning and reporting process more cumbersome to the user, increase the computational load of a performing server and, in turn, degrade the user experience.

Naturally, the ability to perform the operations described above in a faster and more efficient manner can significantly enhance the user experience and reduce the computational load. In turn, this may reduce the associated maintenance and management costs of the service while enhancing the user experience and satisfaction. Accordingly, there exists a dire market need for systems and methods that can enhance code scanning, analysis and reporting.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for code scanning and reporting, and in particular reducing occurrences of false positives during reporting.

Generally, a scanning service may receive code for analysis. In one embodiment, the scanning service may include one or more scanners. In one embodiment, the scanners may perform static analysis on the code. Static analysis or static code analysis may be a method of computer program debugging that examines code without executing the code. This process may provide an understanding of an associated code structure, and may help to ensure that the code adheres to industry standards and that the code is free of errors.

One embodiment of the disclosure may be scanner service configured to perform static scans on code provided by users. In some examples, the user may select a specific rule set to apply to the code when scanned. For example, a USA rule set may be a plurality of code patterns that may cause potential issues if the code is executed in the USA. In one example, the code may use a date format different from the standard format used in the USA (e.g., mm/dd/yy). The scanner service may provide the results back to the user. However, these results may include one or more false positives. One embodiment described herein, provides a graphical user interface where the user may designate results as false positives. The user may also designate a scope for each result designated as a false positive. In turn the scanner service may ignore other results associated with similar false positives. Additionally, the level of application may be selected by the user according to the scope designation. In turn, this may reduce the processing power required for scanning. Similarly, this may enhance the user experience as the amount of false positives that will be presented to the user may be significantly reduced. Accordingly, the user may focus on issues that are more likely to be significant.

Figure 1A:
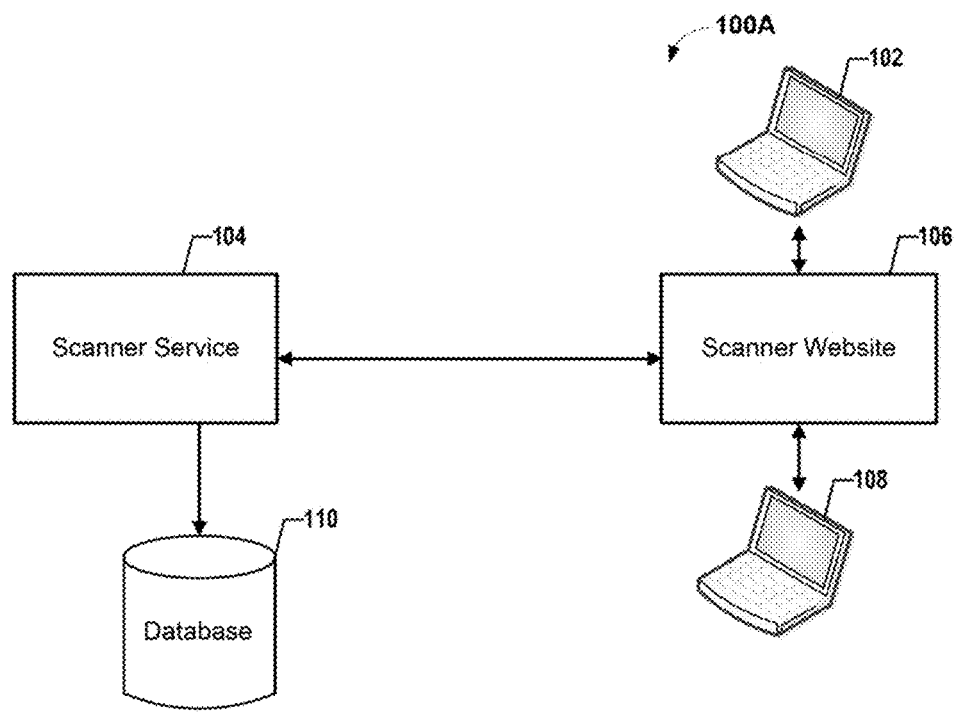
FIGS. 1A-1B illustrate scanning and reporting processes in accordance with one or more example embodiments of the disclosure.

FIG. 1A depicts an example environment 100A in which one or more devices may operate in accordance with one or more embodiments of the disclosure. A scanner service 104 may be in communication with a scanner website 106. In one example, a user device 108 (e.g., customer) may upload code using the scanner website 106 for analysis. In one implementation, the code may be uploaded for static analysis. The website may transmit the code or portions of the code to the scanner service 104. The scanner service 104 may be responsible for performing the static analysis. The scanner service may perform the static analysis on the code and store the result in database 110. In one example, the database is a Dynamo database. In some examples, the scanner service 104 may search for predetermined patterns within the code. For example, the predetermined patterns may be patterns within the code that are stored in the database 110 and are identified as patterns that may cause errors during execution. In one example, the scanner may determine that a file needed to execute the code is not locally available. In such example, a warning may be stored in association with the code for loading the file. In a different example, the scanner service 104 may identify a date format within the code and provide a warning associated with the date format. In one implementation, the date format may be a month followed by a day followed by a year.

The results may be fetched from the database 110 and transmitted to the scanner website 106, for example, via a network. In turn, the results may be provided to the user device 108 for display. A user may view the results, for example, via the scanner website 106. The user may identify and/or designate warnings associated with false positives. A warning associated with a false positive may, for example, be a warning that would not cause any problems when the code is executed. However, a valid warning may be warning associated with code that causes issues and/or problems when executed. The identified warnings associated with false positives may be provided to the scanner service 104 for storage at the database 110. In turn, the identified warnings associated with false positives may be fetched and provided to a user device 102, for example, via the scanner website 106. A user of the user device 102 (e.g., an administrator) may review the warnings associated with false positives to approve or disapprove the designation of the warnings associated with false positives as false warnings. Data indicative of the approval or disapproval may be transmitted to the scanner service 104 for storage in the database 110. Each warning designated as a false warning may be associated with one or more specific code patterns. These specific patterns may be stored in association with a false positive identifier in the database 110.

Figure 1B:
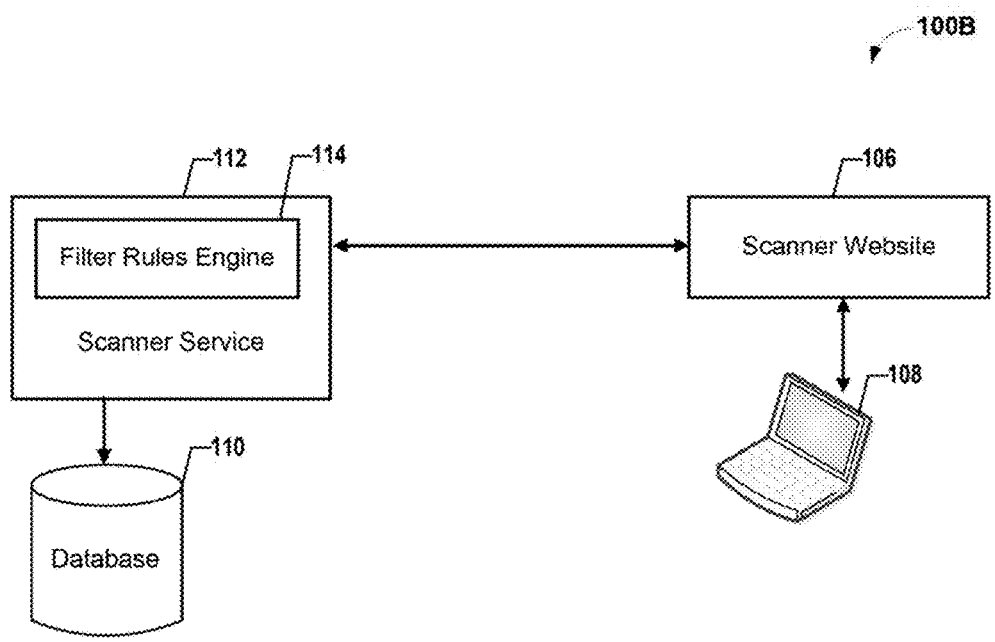

A different embodiment is depicted in FIG. 1B. A user device 108 may provide code to the scanner website 106 for analysis. In one example, the code may be provided in association with a package or a package identifier. For example, the user device 108 may upload a code package (e.g., plurality of files) for analysis using the scanner website 106. The code or the package (e.g., plurality of files) may be transmitted to a scanner service 112. In turn, the scanner service 112 may provide the results to the scanner website 106. The scanner website 106 may then provide the results for display at the user device 108.

In one example, the scanner service 112 may determine a location of a user device uploading the code and provide warnings based on a specific set of rules associated with the location. For example, the scanner service 112 may determine that the code was uploaded by a user device in India. In turn, the scanner service 112 may search for specific code patterns associated with India and stored in the database 110. Similarly, the scanner service 112 may determine that the code was uploaded by a user device in Europe. In turn, the scanner service 112 may search for specific code patterns associated with Europe and stored in the database 110. In some embodiments, the user may provide user input for selecting a particular rule set associated with a particular location (e.g., North American rule set, Indian rule set, European rule set and/or the like).

Figure 2A:
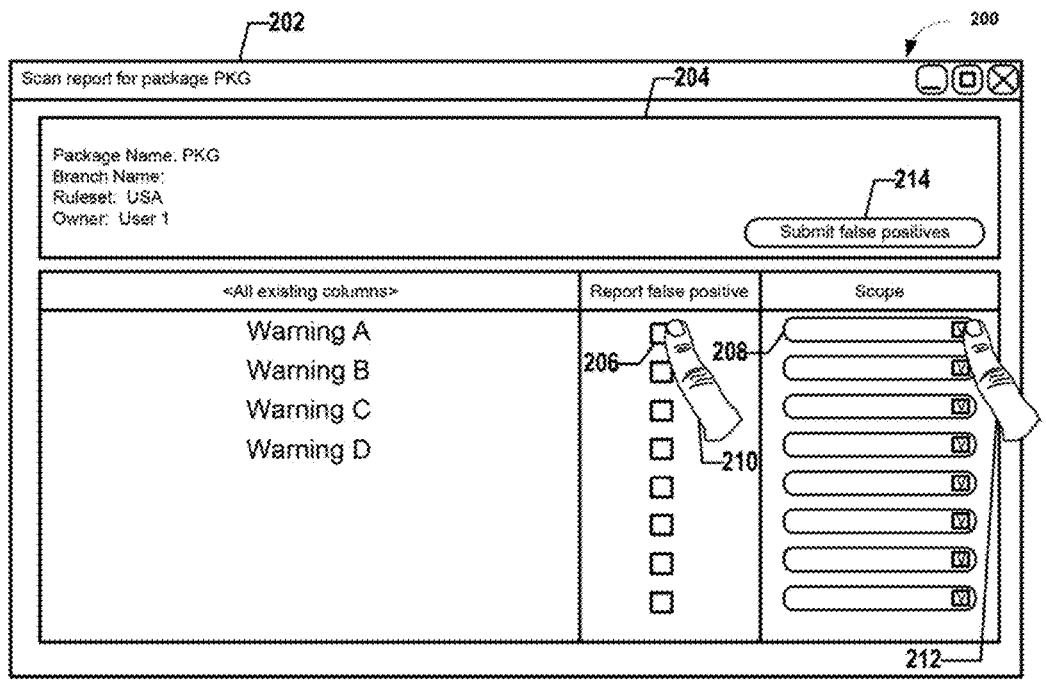
FIGS. 2A-2B illustrate an example graphical user interface (GUI) for reporting scan results to users and for receiving user input in association with the scan results, in accordance with one or more example embodiments of the disclosure.
Figure 2B:
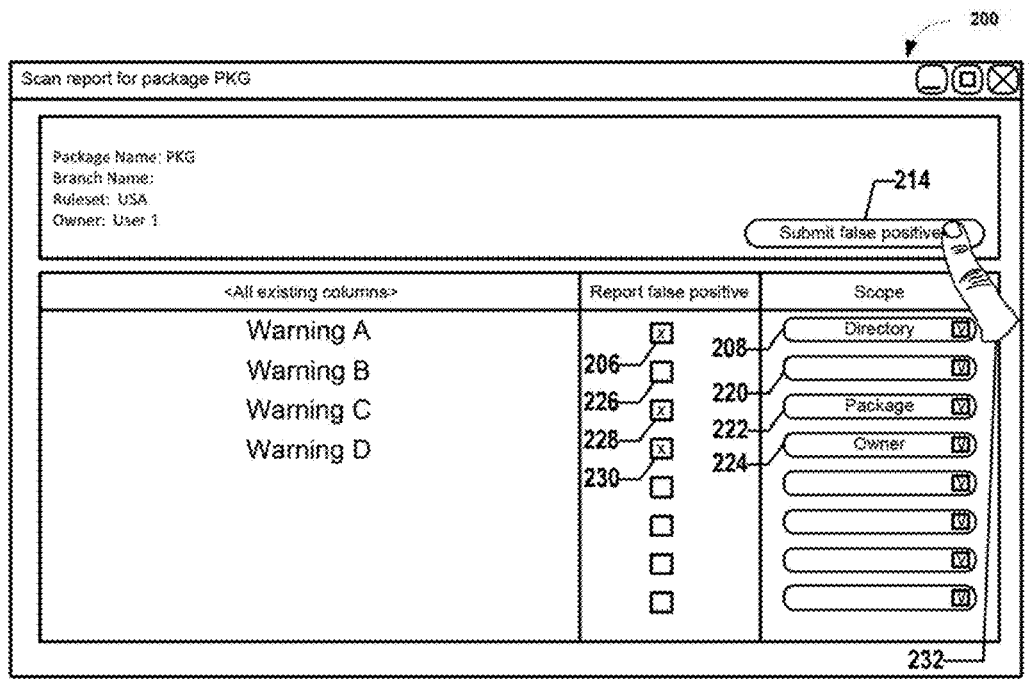

The results may be displayed as shown in FIGS. 2A-2B. FIGS. 2A-2B depict a graphical user interface (GUI) 200 and/or a website for displaying scanning results and receiving user input. The GUI 200 may include a title element 202 for displaying an identifier of the package (e.g., the package of files being uploaded). In one example, the identifier may be the name of the package PKG. The GUI may further include an element 204. Element 204 may include a variety of information associated with the package. In one example, the element 204 may display the package name PKG. In one embodiment, the element 204 may display the selected rule set. For example, the element 204 may display that the USA rule set is selected or is being used for the analysis of the package. The element 204 may also display an identifier for the user or an account of the user.

Furthermore, the GUI 200 may display a plurality of warnings. For example, the GUI 200 may display warnings A-D as depicted in FIGS. 2A-2B. Warning A may be associated with element 206 for reporting false positive warnings. In one example, user interaction 210 may indicate that warning A is a false positive. A second interaction with the element 206 may remove the indication that warning A is a false positive. Similar elements are shown that are associated with warnings B-D. An element 208 may also be associated with warning A and element 206. In one embodiment, the element 208 may be inactive when the element 206 is not checked. The element 208 may be for selecting a scope. For example, the element 208 may be a drop down menu that provides a variety of scope options for user selection via interaction 212. In one example, the user may be able to select between a file option, a directory option, a package option and/or an owner option. If the user selects the file option, rules determined based on the indication that warning A is a false positive are applied to the code within the file containing the portion of the code that triggered warning A. However, if the user selects the directory option, the rules determined based on the indication that warning A is a false positive are applied to the code within the directory containing the portion of the code that triggered warning A. Similarly, if the user selects the package option, the rules determined based on the indication that warning A is a false positive are applied to the code within the entire package. However, if the user selects the owner option, the rules determined based on the indication that warning A is a false positive are applied to the code belonging or uploaded by the same user or in association with the same user account. Other suitable levels of impact may be provided. In one example, multiple levels of directory granularity may be provided. In one example, a project identifier may be stored in association with each uploaded package and a project scope is available for selection using the element 208. A plurality of similar elements are shown that are associated with warnings B-D.

FIG. 2B depicts the GUI 200 after receiving the user input and/or selections. The user indicated, via interactions, with elements 206, 228, and 230 that warnings A, C and D are false positives. The user selected the directory option via element 208, the package option via element 222 and the owner option via element 224. The user may then interact with element 214 for submitting the selections. Similarly, the user may indicate that warning B is valid by not interacting with element 226 and/or element 220.

With reference back to FIG. 1B, once the user device 108 provides data indicative of the selections of the user, for example, using the GUI 200, the scanner website 106 may provide data representing the user selections to the scanner service 114. The scanner device 114 may in turn provide the data representing the user selections to the filter rule engine 112. The filter rule engine 112 may determine rules based on the received data representing the user selections. For example, rule engine 112 may determine that warning A, C and D are false positives but that warning B is a valid warning. The rule engine 112 may determine a rule based on warning A being a false positive. The rule may ignore code patterns matching or similar to the code patterns that triggered warning A. This rule, however, may be applied to the entire directory that contains the code patterns that triggered warning A. In some implementations, the user may select specific directories to apply the rule to. Similarly, rules based on warning C may be applied to the package PKG and rules based on warning D may be applied to all code uploaded by or belonging to a particular user (e.g., user 1). In turn, the rules are provided by scanner service 112 to database 110 for storage in association with the respective identifiers and a respective scope. The filter rules engine 114 and/or the scanner service 112 then enforces the stored rules appropriately according to their respective scope.

For example, specific patterns may be ignored during scanning of the code or during scanning of other codes associated with the user of the user device 108. Similarly, the warnings that are stored in the database 110 in association with these one or more specific patterns may be filtered, removed and/or deleted. Also, as described herein, the warnings that are stored in the database 110 in association with these one or more specific patterns may be filtered according to a respective scope stored in the database 110 in association with the warning and/or the specific patterns.

Illustrative Device Architecture

As used herein, the terms "data," "content," "information," and similar terms may be used interchangeably to refer to data capable of being transmitted, received, and/or stored in accordance with embodiments of the present disclosure. Thus, the use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Example Scanning System

Figure 3:
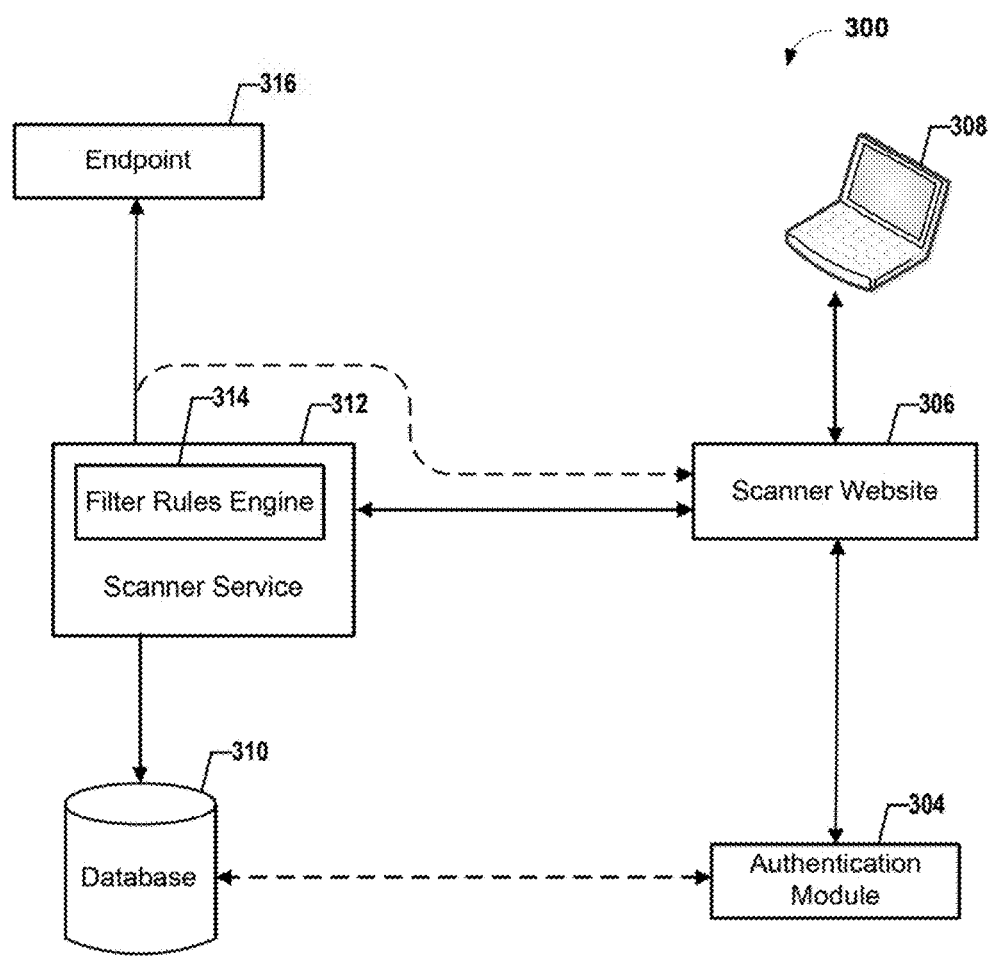
FIGS. 3-4 illustrate an example environment in which one or more devices may operate according to one or more example embodiments of the disclosure.

FIG. 3 depicts an example environment 300 in which one or more devices may operate in accordance with one or more embodiments of the disclosure. A user device 308 may provide code to a scanner website 306 for analysis. In one example, the code may be provided in association with a package or a package identifier. For example, the user device 308 may upload a code package (e.g., plurality of files) for analysis using the scanner website 306. The code or the package (e.g., plurality of files) may be transmitted to the scanner service 312. In turn, the scanner service 312 may provide the results to the scanner website 106. The scanner website 106 may then provide the results for display at the user device 308.

A user may provide login credentials to the scanner website 306. In one example, the login credentials may be a login name and a login password. The login credentials may be associated with at least one user account. The user account may be associated with particular privileges and may be used for the purpose of billings. The login credentials may be transmitted to an authentication module 304. The authentication module 304 may be responsible for validating the login credentials and granting user access to upload code for analysis. The authentication module 304 may compare the provided login credentials to respective login credentials stored onto the database 310. If the provided login credentials match the login credentials stored onto the database, the authentication module 304 may provide data to the scanner website 306 indicative of a successful login. However, if the login credentials do not match, the authentication module 304 may provide an indication of a login failure to the scanner website 306. In turn, the scanner website 306 may then prevent the user from uploading code for analysis.

In one example, the scanner service 312 may determine a location of a user device uploading the code and provide warnings based on a specific set of rules associated with the location. For example, the scanner service 312 may determine that the code was uploaded by a user device in North America. In turn, the scanner service may search for specific code patterns associated with North America and stored in the database 310. Similarly, the scanner service 312 may determine that the code was uploaded by a user device in Europe. In turn, the scanner service 312 may search for specific code patterns associated with Europe and stored in the database 310. In some embodiments, the user may provide user input for selecting a particular rule set associated with a particular location (e.g., North American rule set, Indian rule set, European rule set and/or the like).

The results may be displayed as discussed with reference to FIGS. 2A-2B. The GUI 200 may display a plurality of warnings. For example, the GUI 200 may display warnings A-D as depicted. The user device 308 may utilize the GUI 200 to view the scan results. The user device 308 may also utilize the GUI 200 to receive user input designating one or more warnings as a false positive and a respective scope in association with each warning designated as a false positive.

Once the user device 308 provides data indicative of the user selections, for example, using the GUI 200, the scanner website 306 may provide data representing the user selections to the scanner service 312. The scanner service 312 may in turn provide the data representing the user selections to the filter rules engine 312. The filter rules engine 312 may determine rules based on the received data representing the user selections. For example, the filter rules engine 312 may determine that warnings A, C and D are false positives but that warning B is a valid warning. The filter rules engine 312 may determine a rule based on warning A being a false positive. The rule may ignore the code patterns matching or similar to the code patterns that triggered warning A. This rule, however, may be applied to the entire directory that contains the code patterns that triggered warning A based on the selected scope. In one example, this rule may be applied to the entire package or a portion of the package or all code associated with a particular project identifier. In some implementations, the user may select specific directories to apply the rule to. In one example, rules based on warning C may be applied to the package PKG and rules based on warning D may be applied to all code uploaded by or belonging to a particular user (e.g., user 1).

In turn, the rules are provided by the scanner service 312 to the database 310 for storage in association with the respective identifiers and a respective scope. The filter rules engine 314 and/or the scanner service 312 may then enforce the stored rules appropriately according to their respective scope. For example, specific patterns may be ignored during scanning of the code or during scanning of other codes associated with the user of the user device 308 or a user account. Similarly, warnings that are stored in the database 310 in association with these one or more specific patterns may be filtered, removed and/or deleted. The filter rules engine 314 may apply the stored rules to future scans associated with the respective identifiers and may filter the stored rules based on their respective scope during future scans associated with the respective identifiers. For example, additional code uploaded in association with the package PKG (e.g., identifier PKG) may be filtered according to the same rule set discussed above. In one example, other code uploaded in association with the same user account (e.g., user account identifier) may also be filtered according to the same rule set. The user, when uploading the code, may provide different levels of impact having different granularity. The granularity may indicate the level at which the rule set is to be applied. As discussed, a user may selectively apply rules to, for example, packages, files, projects, sections of code, an entire user account, code associated with the user account, code associated with particular location identifiers, and/or other suitable and/or similar identifiers. These as well as other suitable granularity levels may be used. In one example, the user may select a different granularity level for each result designated as false positive.

In some implementations, the user may provide input indicative of a type of warning is to be ignored. For example, the user may specify that date format warnings are to be ignored in future scans associated with the user. The user may further indicate that the warnings are to be ignored only within a particular file, directory, code line and/or the like.

The scan results filtered based on the filter rules engine 314 may be provided to the scanner website 306 for display on the user device 308. The user may view the final results using the user device 308. The final results may include fewer warnings than the unfiltered scan results. This may allow the user to focus on important issues or important problems. This may reduce the time the user spends to review results and in turn improve the user experience. Additionally, this may reduce the computational load on the scanner service.

An authentication process similar to the authentication process described above may be used to access the final results via the scanner website 306. The results may also be transmitted to an endpoint 316. Endpoint 316 may be a server or a computing device as described herein. The endpoint 316 may further manipulate, sort and/or filter the final results in various manners. In one example, a server at the endpoint 316 may further analyze the code package based on the final results. In one example, the endpoint 316 may provide the code package to the scanner service 312. In one example, the endpoint 316 may be a website. In one example, the endpoint 316 may be a database.

Figure 4:
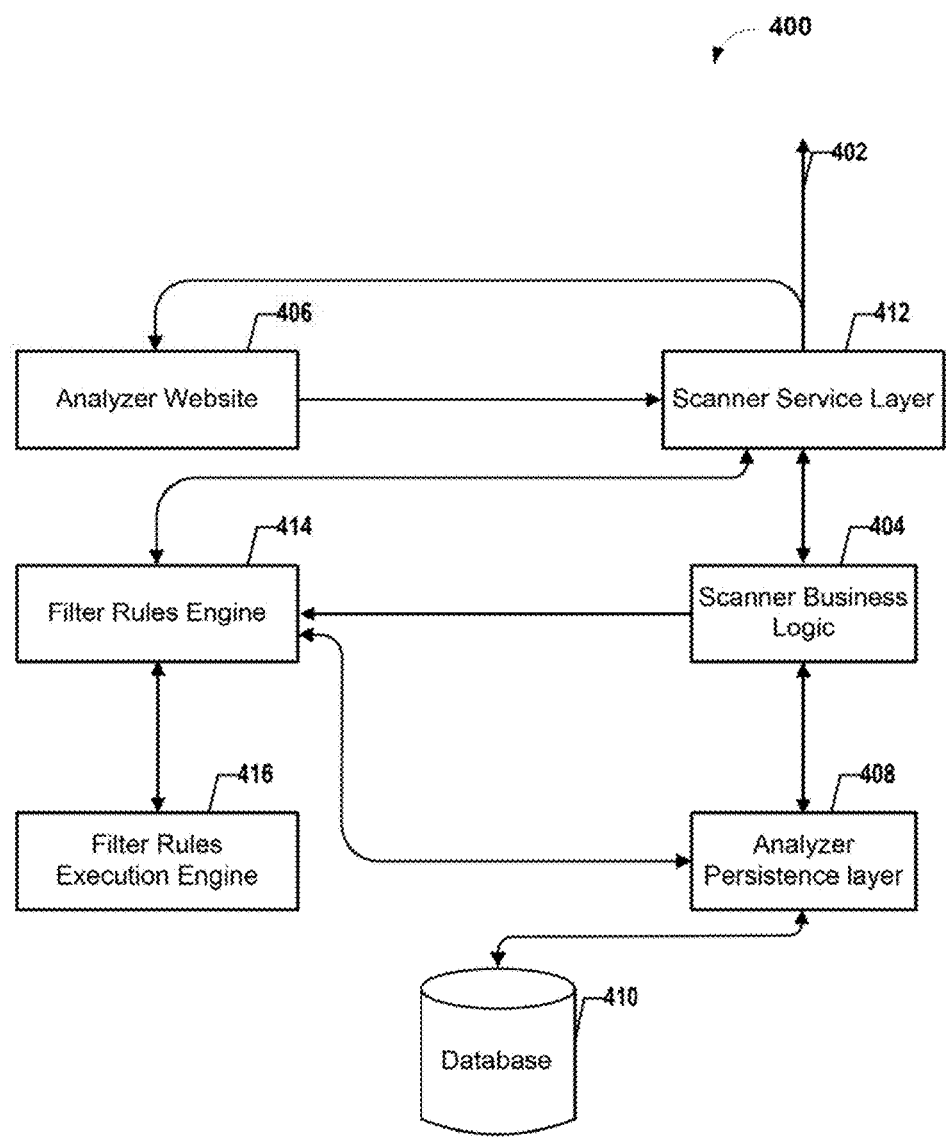

FIG. 4 depicts an example environment 400 in which one or more devices may operate in accordance with one or more embodiments of the disclosure. An analyzer website 406 may be one or more servers and/or computing devices. The analyzer website 406 may receive code or instructions to analyze code by the scanner service layer 412. The code or the instructions to analyze the code may be transmitted to the scanner service layer 412. The scanner service layer 412 may perform static analysis on the code. The results of the static analysis may be transmitted to the analyzer website 406 for display to a user. The user may provide user input designating warnings and/or issues as either valid or false positive. The user may also provide a scope in association with each warning and/or issue. Similar data may also be transmitted to the filter rules engine 414. The filter rules engine 414 may determine based on the data one or more new rules each having a respective scope.

The rules may be provided to the analyzer persistence layer 408 for storage onto the database 410. The analyzer persistence layer 408 may be responsible for storing and fetching data from the database 410. In one example, the analyzer persistence layer 408 may monitor the database 410 and perform various operations to reduce storage errors. The analyzer persistence layer 408 may perform various error correction algorithms. In one example, the analyzer persistence layer 408 may compress and/or decompress data. For example, the analyzer persistence layer 408 may compress data that is to be stored. Similarly, the analyzer persistence layer 408 decompresses data fetched from the database 410. Different compression and decompression algorithms may be suitable for use with different databases and database types. Generally, such operations may enhance the performance of the database and increase the effective storage size of the database.

The scanner business logic 404 may receive the scan results and provide the scan results for storage by the analyzer persistence layer 408 at the database 410. The scanner business logic 404 may also provide the scan results to filter rules engine 414. In turn, the filter rules engine 414 may provide the scan results filtered according to the rules to the analyzer persistence layer 408 for storage at the database 410.

The filter rules execution engine 416 may be responsible for enforcing the rules determined by the filter rules engine 414 based on the user input identifying false positives and specifying a scope. The filter rules execution engine 416 may enforce rules based on their respective scope. In one example, the filter rules execution engine 416 may directly fetch rules for enforcement from the database 410 based on respective identifiers associated with the rules. In one example, the analyzer persistence layer 408 may fetch stored rules from the database 410. The analyzer persistence layer 408 may provide the fetched rules to the filter rules engine 414. In turn, the filter rules engine 414 may provide the fetched rules to the filter rules execution engine 416 for enforcement, execution and/or the like. Finally, the scan results may be retrieved at the scanner service layer 412 (e.g., the endpoints described above).

In one example, a rule associated with a package scope may be fetched and provided to the filter rules execution engine 416. In turn, the filter rules execution engine 416 may enforce the rule according to the scope stored in association with the rule. In this example, the rule may be applied to a package having a package identifier stored in association with the rule. The package identifier may also be fetched and provided to the filter execution engine 416. The filter execution engine 416 may then filter the scanning results of the package according to the rule.

Computing Device

Figure 5:
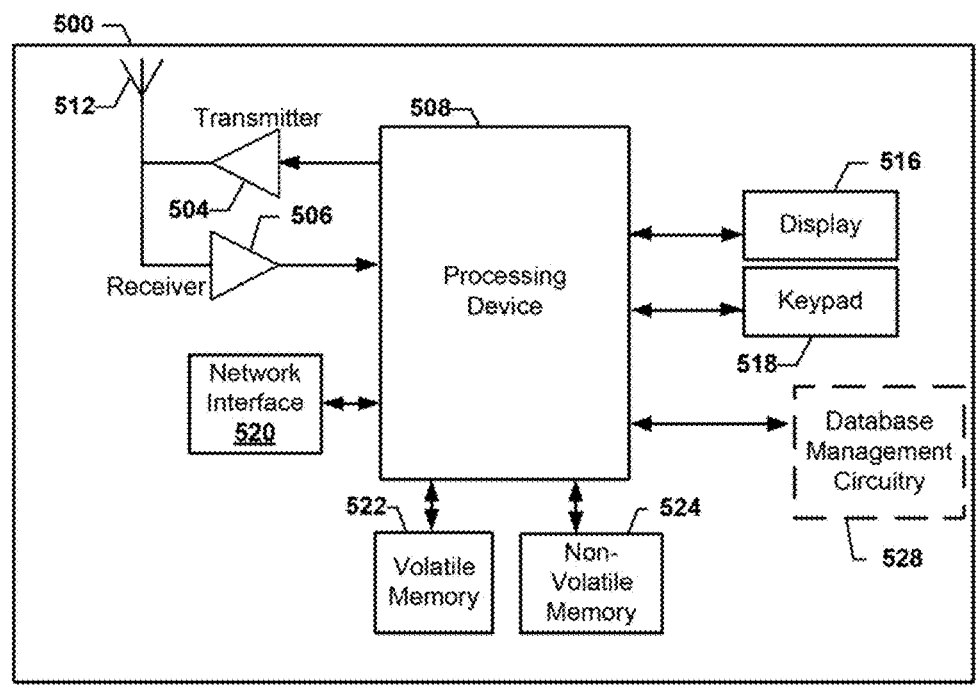
FIG. 5 illustrates an example schematic diagram of a computing device according to one or more example embodiments of the disclosure.

FIG. 5 illustrates an example schematic diagram of a computing device 500 and/or entity according to one or more example embodiments of the disclosure. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The computing device 500 can be operated by various parties and/or automatically. As shown in FIG. 5, the computing device 500 can include an antenna 512, a transmitter 504 (e.g., radio), a receiver 506 (e.g., radio), and a processing device 508 (e.g., CPLDs, microprocessors, multi-core processors, co-processing entities, ASIPs, microcontrollers, and/or controllers) that provides signals to and receives signals from the transmitter 504 and the receiver 506, respectively.

The signals provided to and received from the transmitter 504 and the receiver 506, respectively, may include signaling information in accordance with air interface standards of applicable wireless systems. In this regard, the computing device 500 may be capable of operating with one or more air interface standards, communication protocols, modulation types, and access types. More particularly, the computing device 500 may operate in accordance with any of a number of wireless communication standards and protocols. In a particular embodiment, the computing device 500 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 500 may operate in accordance with multiple wired communication standards and protocols, via a network interface 520.

Via these communication standards and protocols, the computing device 500 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 500 can also download changes, add-ons, and updates, for instance, to its firmware, software (e.g., including executable instructions, applications, program modules), and operating system.

According to one embodiment, the computing device 500 may include location determining aspects, devices, modules, functionalities, and/or similar words used herein interchangeably. For example, the computing device 500 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 500 position in connection with a variety of other systems, including cellular towers, Wi-Fi access points, and/or the like. Similarly, the computing device 500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 500 may also comprise a user interface (that can include a display 516 coupled to a processing device 508) and/or a user input interface (coupled to a processing device 508). For example, the user interface may be a user application, browser, user interface, and/or similar words used herein interchangeably executing on and/or accessible via the computing device 500 to interact with and/or cause the display of information. The user input interface can comprise any of a number of devices or interfaces allowing the computing device 500 to receive data, such as a keypad 518 (hard or soft), a touch display, voice/speech or motion interfaces, or other input devices. In embodiments including a keypad 518, the keypad 518 can include (or cause the display of) the conventional numeric (0-9) and related keys (#, *), and other keys used for operating the computing device 500 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 500 can also include volatile memory 522 and/or non-volatile memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 500. As indicated, this may include a user application that is resident on the respective device or accessible through a browser or other user interface for communicating with various other computing entities. As will be recognized, these architectures and descriptions are provided for example purposes only and are not limited to the various embodiments.

The computing device 500 may optionally include database management circuitry 528. In one implementation, the database management circuitry 528 may be embodied as software executed on the processing device 508. In a different implementation, the database management circuitry 528 may be a processing device in communication with the processing device 508. The database management circuitry 528 may be responsible for managing one or more databases. In one implementation, the database management circuitry 528 may store and maintain a tree (e.g., b-tree and/or the like) in association with each database. For example, the tree may be used by the database management circuitry 528 to facilitate searching for data in the database 608 of FIG. 6. The database management circuitry 528 may receive and process search requests via the network interface 520. Similarly, referring to FIG. 6, the database management circuitry 528 may provide the search results to user devices 602A-602N and/or the client devices 604A-604N. In some implementations, the server 610 may perform the operations described above with reference to the database management circuitry 528.

Code Scanning Service

As used herein, the term "code scanning service" may include a service that is accessible via one or more computing devices and that is operable to receive code for analysis and storage onto one or more storage devices of the code scanning service. The code scanning service may also facilitate retrieval of data from the database storage devices. The data may be retrieved by the server 610 during performance of the analysis. The stored data may be backed up in one or more additional storage devices to ensure that the data is preserved.

As used herein, the terms "client" and "storing entity" may be used interchangeably and may include, but are not limited to, a business owner, shopkeeper, tradesperson, vendor, operator, entrepreneur, agent, dealer, organization or the like that is in the business of providing a good, service or experience to a consumer, facilitating the provision of a good, service or experience to a consumer, and/or otherwise operating in the stream of commerce. The "client" and "storing entity" may also include individuals, households, and/or the like. As used herein, the terms "consumer" and "user" may be used interchangeably and may include, without limitation, individuals, groups of individuals, corporations, other merchants, and the like.

As used herein, the term "communication channel data" refers to electronic information relating to the particular device or communication channel upon which a client communicates with the database storage and management service. In this regard, communication channel data may include the type of device used by the client (e.g., smartphone, phone, desktop computer, laptop, netbook, tablet computer), the Internet Protocol (IP) address of the device, the available bandwidth of a connection, login credentials used to access the channel (e.g., a user account and/or password for accessing the code scanning service), or any other data pertaining to the communication channel between the code scanning service and an entity external to the code scanning service.

Figure 6:
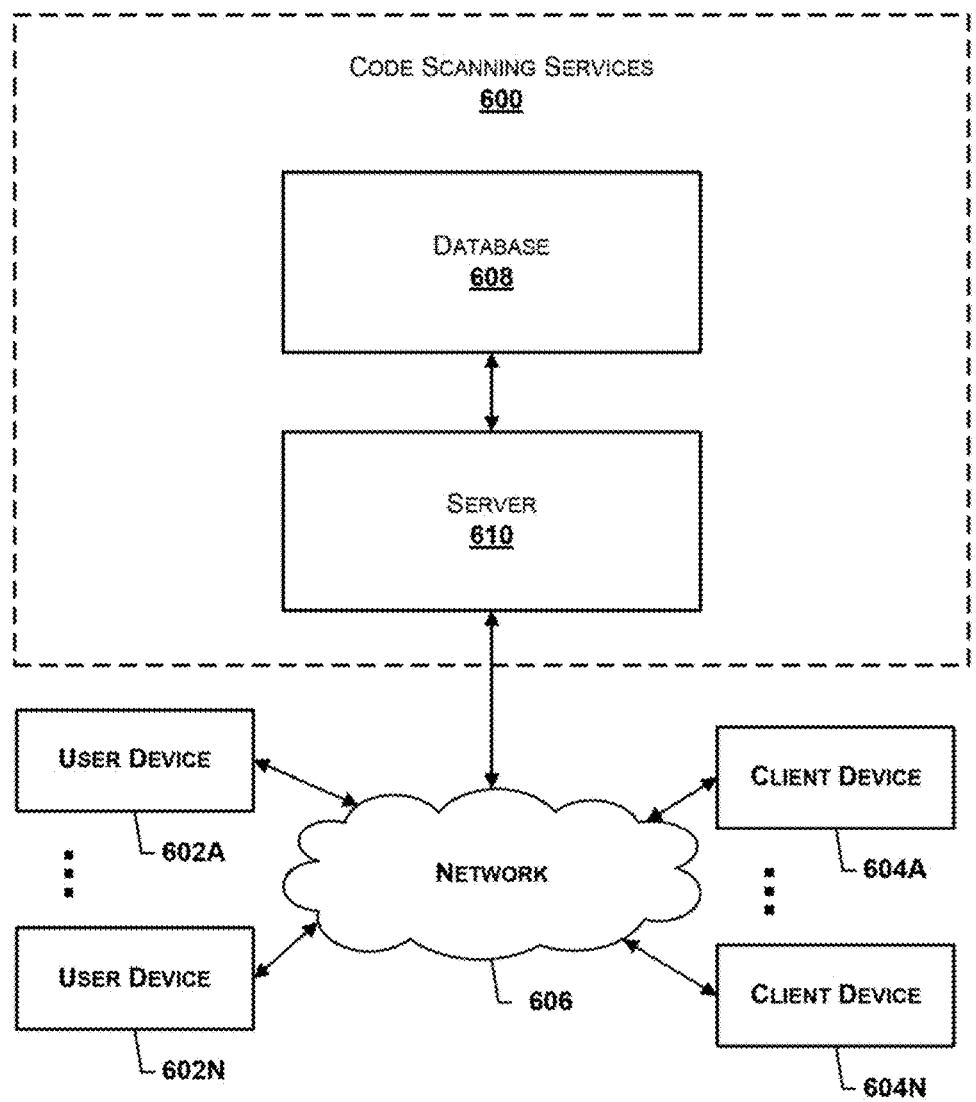
FIG. 6 illustrates an example environment in which one or more devices may operate according to one or more example embodiments of the disclosure.

FIG. 6 discloses an example code scanning service 600 within which embodiments of the present disclosure may operate. Clients may access a code scanning service 600 via a network 606 (e.g., the Internet or the like) using one or more user devices 602A-602N or one or more client devices 604A-604N. Moreover, the code scanning service 600 may comprise a server 610 in communication with a database 608. Other communication channels may also be formed between the client devices 604A-604N, the user devices 602A-602N, the database 608 and/or the like.

The server 610 may be embodied as a computer or computers as described herein (e.g., the computing device 500). The server 610 may provide for receiving electronic data from various sources including, but not necessarily limited to, the user devices 602A-602N or one or more client devices 604A-604N. For example, the server 610 may be operable to receive and process code provided by the client devices 604 for analysis. Similarly, the server 610 may facilitate fetching of the stored data by the client devices 604 and/or the user devices 602. The server 610 may also track and log information associated with storage and retrieval. The server 610 may also be responsible for performing the scanning operations described herein, and for storing/fetching rules in the database 608.

The database 608 may be embodied as a data storage device such as a Network Attached Storage (NAS) device or devices, or as a separate database server or servers. The database 608 includes information accessed and stored by the server 610 to facilitate the operations of the code scanning service 600. For example, the database 608 may include, without limitation, user account credentials for system administrator privileges, access operations, data modifying operations and/or the like.

The user devices 602A-602N and the client devices 604A-604N may be any computing device as described above and operated by a user. Electronic data transferred between the server 610 and the user devices 602A-602N and the client devices 604A-604N may be provided in various forms and via various methods. For example, the user devices 602A-602N and the client devices 604A-604N may include desktop computers, laptop computers, smartphones, netbooks, tablet computers, wearables, and the like. The information may be provided through various sources on these devices.

In embodiments where a user device 602 or a client device 604 is a mobile device, such as a smartphone or a tablet, the user device 602 or the client device 604 may execute an "app" to interact with the code scanning service 600. Such apps are typically designed to execute on mobile devices, such as tablets or smartphones. For example, an app may be provided that executes on mobile device operating systems. These platforms typically provide frameworks that allow apps to communicate with one another and with particular hardware and software components of mobile devices. Communication with hardware and software modules executing outside of the app may be provided via application programming interfaces (APIs) provided by the mobile device operating system.

Additionally or alternatively, the user device 602 or the client device 604 may interact through the code scanning service 600 via a web browser. As yet another example, the user device 602 or the client device 604 may include various hardware or firmware designed to interface with the code scanning service 600 (e.g., where the user device 602 or the client device 604 is a purpose-built device offered for the primary purpose of communicating with the code scanning service 600).

Illustrative Processes

Figure 7A:
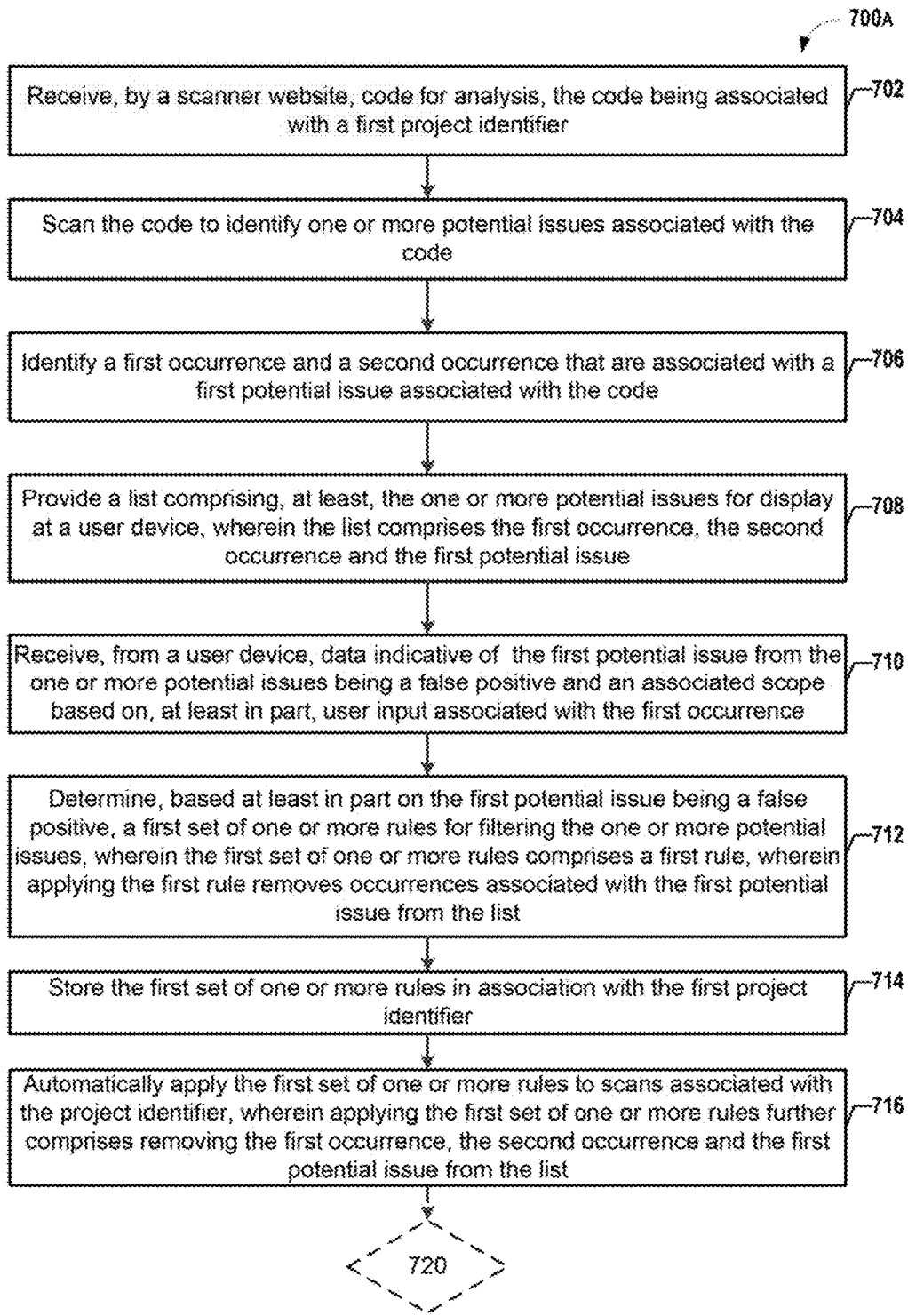
FIGS. 7A-7B and 8A-8B are flowcharts illustrating various procedures and operations that may be completed in accordance with one or more example embodiments of the disclosure.
Figure 7B:
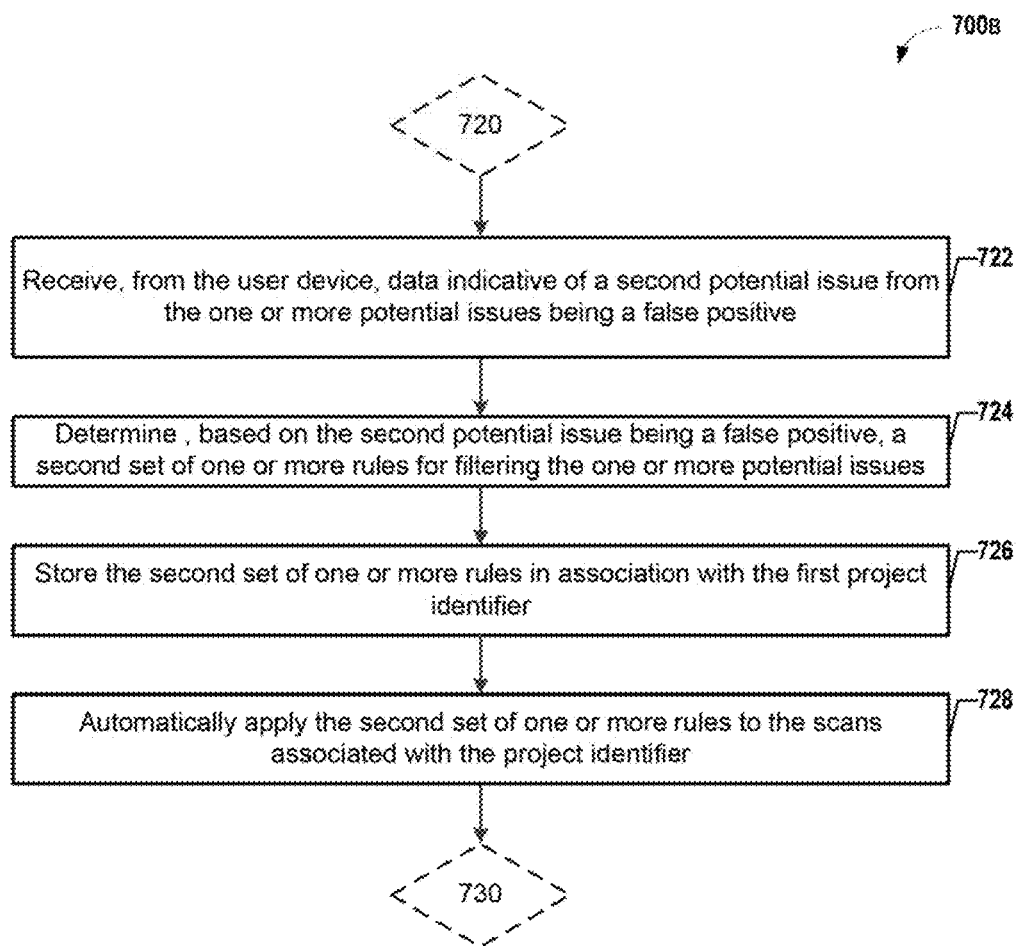

FIGS. 7A-7B are flowcharts illustrating example processes 700A and 700B that may be completed in accordance with various embodiments of the disclosure. The process 700A may begin with receiving, by a scanner website, code for analysis, the code being associated with a first project identifier (702). For example, a scanner website 106 may receive from the user device 108 a package containing a plurality of files of code for analysis. In one example, the package may include a plurality of directories and subdirectories of files. The website may include a GUI for uploading code, files and/or packages using the scanner website 106. In some implementations, the scanner website 106 or the scanner service 112 may determine the location of the user device 108 when uploading the code, files and/or packages. In one example, the scanner service 112 may select a rule set for scanning based on the determined location. In one example, the user may select the rule set or provide information indicative of a location associated with the code (e.g., USA, India, Europe and/or the like).

The process 700A may continue with scanning the code to identify one or more potential issues associated with the code (704). For example, the scanner service 112 may fetch one or more code patterns from the database 110 and perform a search for patterns matching the fetched patterns (or similar to the fetched patterns) within the code. In one example, the fetched patterns may be selected based on the location associated with the package. The scanner service 112 may then identify potential issues associated with the code and provide the results back to the scanner website 106 for display on the user device 108.

The process 700A may continue with identifying a first occurrence and a second occurrence that are associated with a first potential issue associated with the code (706). For example, a first potential issue may be associated with a date format. For example, the scanner service may identify a first portion of the code containing a date format that is not conforming to the USA rule set. Also, the scanner service may identify a second portion of the code containing the date format that is not conforming to the USA rule set.

The process 700A may continue with providing a list comprising, at least, the one or more potential issues for display at a user device, wherein the list comprises the first occurrence, the second occurrence and the first potential issue (708). For example, the scanner service 112 may provide the results of the scanning to the scanner website 106 for display at the user device 108. In turn, the process 700A may continue with receiving, from a user device, data indicative of the first potential issue from the one or more potential issues being a false positive and an associated scope based on, at least in part, user input associated with the first occurrence (710). For example, the user may interact with a GUI displayed at the user device 108 to indicate that the first occurrence of the first potential issue is a false positive. The user may also specify a scope as described with reference to FIG. 2.

The process 700A may continue with determining, based at least in part on the first potential issue being a false positive, a first set of one or more rules for filtering the one or more potential issues, wherein the first set of one or more rules comprises a first rule, wherein applying the first rule removes occurrences associated with the first potential issue from the list (712). For example, the filter rules engine 114 may determine based on the user indication, one or more filtering rules. In one example, the filtering rule may remove occurrences associated with the first potential issue from the list. For example, the filter rules engine 114 may remove the second occurrence associated with the first potential issue from the list. In turn, the process 700A may store the first set of one or more rules in association with the first project identifier (714). For example, the determined one or more rules may be stored at the database 110.

Finally, the process 700A may continue with automatically applying the first set of one or more rules to scans associated with the project identifier, wherein applying the first set of one or more rules further comprises removing the first occurrence, the second occurrence and the first potential issue from the list (716). For example, automatically applying the first set of rules may filter the list to remove the first occurrence, the second occurrence and the first potential issue. In one implementation, each rule from the rule set may be associated with a scope. The scope may specify locations, directories, and/or files that the rule is applicable to. Each rule may be stored along in association with a respective scope. The rule is then automatically applied based on its respective scope.

For example, a rule may specify that a specific pattern may be ignored during scanning of the code or during scanning of other codes associated with the owner of the user device 108. Similarly, warnings that are stored in the database 110 in association with the specific pattern may be filtered, removed and/or deleted.

The process 700A may optionally continue with the steps of process 700B. The process 700B may begin with receiving, from the user device, data indicative of a second potential issue from the one or more potential issues being a false positive (722). For example, the second potential issue may be a potential syntax error that is associated with a particular code pattern. The user may indicate that an occurrence associated with the potential issue is a false positive. In turn, the process 700B may determine, based on the second potential issue being a false positive, a second set of one or more rules for filtering the one or more potential issues (724). For example, the filter rules engine 114 may determine a rule associated with the potential issue. The rule may be to associate the particular code pattern with a false positive. The user device 108 may provide a scope for association with the rule and/or the occurrence.

The process 700B may continue with storing the second set of one or more rules in association with the first project identifier (726). For example, the project identifier may be the package identifier. In one example, a project scope may have been selected by the user device 108. The second set of one or more rules may be stored in the database 110 in association with the first project identifier. Finally the process 700B may automatically apply the second set of one or more rules to the scans associated with the project identifier (728). For example, the second set of one or more rules may be applied to the entire package PKG. Similarly, the second set of one or more rules may be applied to code stored in association with a particular project identifier at the database 110. Other code uploaded to the scanner website 106 may be scanned according to the first rule set and/or the second rule set and/or a location rule set. Multiple sets of rules may be applied during scanning of packages.

Figure 8A:
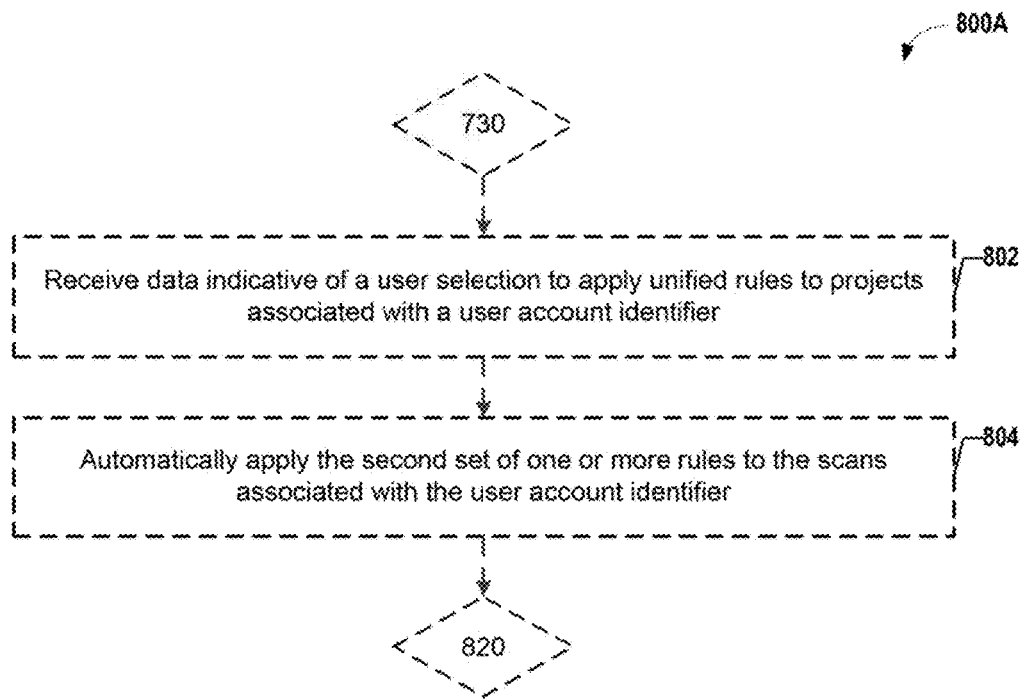
Figure 8B:
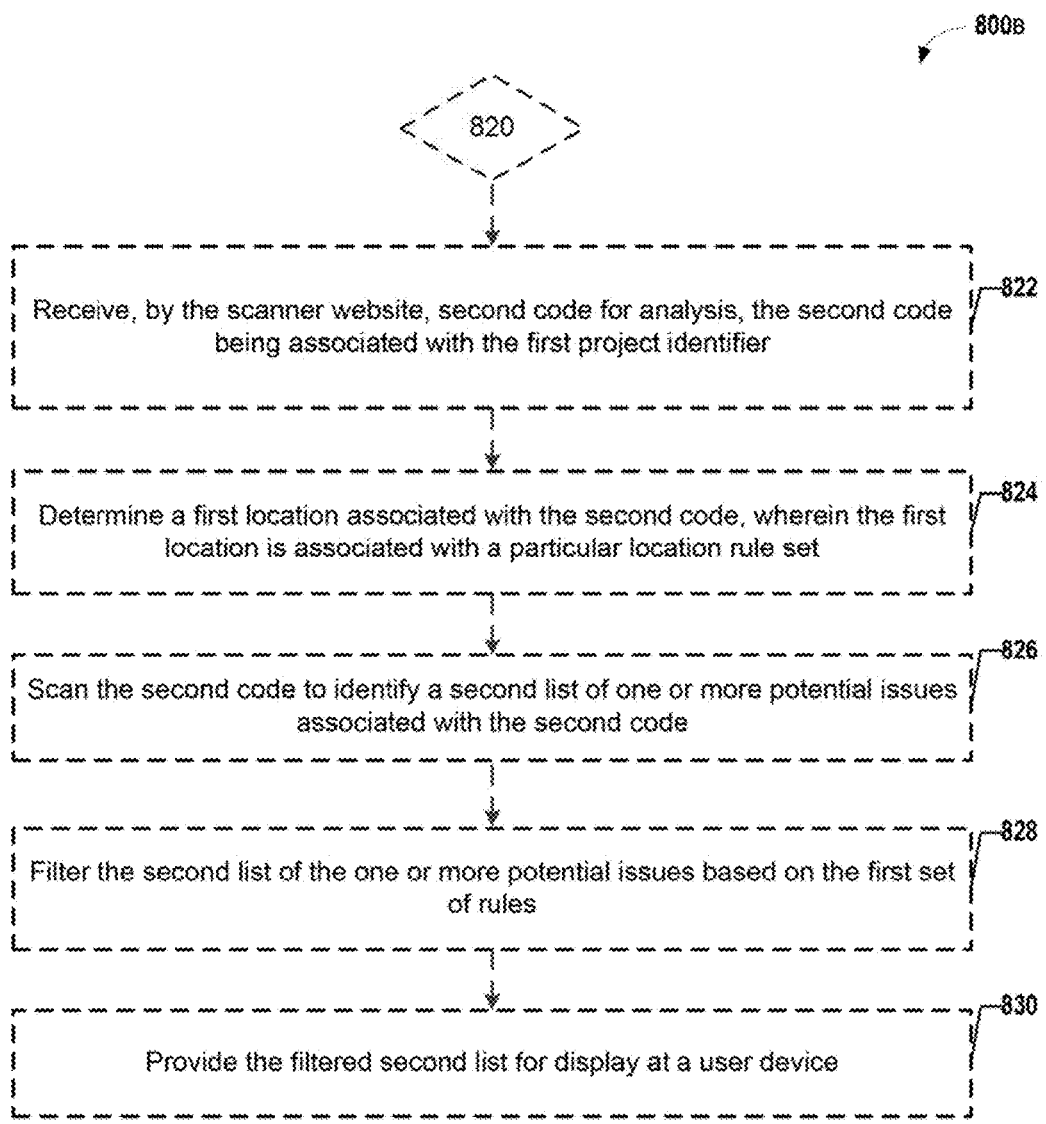

FIGS. 8A-8B are flowcharts illustrating example processes 800A and 800B that may be completed in accordance with various embodiments of the disclosure. In some implementations, the process 800B may continue with the optional steps of process 800A. The process 800A may begin with receiving data indicative of a user selection to apply unified rules to projects associated with a user account identifier (802). A unified rule set or unified rules may be for example a rule set that the user selects to apply to all code associated with the user, the user account and/or the like. For example, the user may select to ignore warnings associated with the date format not conforming to the USA standard format (e.g., mm/dd/yy) within all code associated with their account. In one example, the user device 108 may provide instructions indicative of a user selection to apply a particular set of rules to projects associated with the owner: User 1 of FIG. 2. The process 800A may continue with automatically applying the second set of one or more rules to the scans associated with the user account identifier (804). For example, the particular set of rules may be applied to all code associated with the owner: User 1.

The process 800A may continue with the optional steps of process 800B, shown in phantom. The process 800B may begin with receiving by the scanner website, a second code for analysis, the second code being associated with the first project identifier (822). For example, the process 800B may begin with receiving one or more files associated with the identifier PKG. The process 800B may continue with determining a first location associated with the second code, wherein the first location is associated with a particular location rule set (824). For example, the process 800B may determine that one or more files are associated with a USA location. In one implementation, the scanner website 106 may determine a location of the user device 108 when the one or more files are being uploaded. In one implementation, the code may be received in association with an identifier specifying the location or a location rule set.

The process 800B may continue with scanning the second code to identify a second list of one or more potential issues associated with the second code (826). For example, the scanner service may identify a first portion of the code containing a date format that is not conforming to the USA rule set. Also, the scanner service may identify a second portion of the code containing the date format that is not conforming to the USA rule set. In one example, a second list of potential issues is generated. In turn, the process 800B may continue with filtering the second list of the one or more potential issues based on the first set of rules (828). For example, according to the first rule set, a warning associated with the first portion of the code containing the date format that is not conforming to the USA rule set may be filtered or removed from the list. Finally, the process 800B may end with providing the filtered second list for display at a user device (830). For example, the scanner service 112 may provide the second list for display at a user device 108.

It should be understood that the processes, operations and functionality described above may be implemented in a plurality of systems. For example, the processes, operations and functionality above may be implemented in external and/or internal systems. Similarly, the processes, operations and functionality above may be implemented in a display device such as a television, a monitor, a laptop, a tablet, a mobile phone, a gaming console and/or the like.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory, extended memory or any combination thereof. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A code scanning service comprising:
   a data processing apparatus; and
   a first memory in data communication with the data processing apparatus and storing instructions executable by the data processing apparatus that upon such execution cause the data processing apparatus to perform operations comprising:
   receiving, by a scanner website, code for analysis, the code being associated with a first project identifier;
   scanning the code to identify one or more potential issues associated with the code comprising:
      determining a first geographic location associated with the code;
      determining one or more error patterns associated with the first geographic location, wherein the one or more error patterns are associated with errors during code execution; and
      identifying at least one portion of the code that match the one or more error patterns;
   identifying a first occurrence and a second occurrence that are associated with a first potential issue associated with the code, wherein the one or more potential issues includes the at least one portion;
   determining a list comprising, at least, the one or more potential issues for display at a user device, wherein the list comprises the first occurrence, the second occurrence and the first potential issue;
   receiving, from a user device, data indicative of the first potential issue from the one or more potential issues being a false positive based on, at least in part, user input associated with the first occurrence;
   determining, based at least in part on the first potential issue being a false positive, a first set of one or more rules for filtering the one or more potential issues, wherein the first set of one or more rules comprises a first rule, wherein applying the first rule removes occurrences associated with the first potential issue from the list;
   sorting the first set of one or more rules in association with the first project identifier; and
   automatically applying the first set of one or more rules to scans associated with the first project identifier, wherein applying the first set of one or more rules further comprises removing the first occurrence, the second occurrence and the first potential issue from the list.

2. The code scanning service of claim 1, wherein the operations further comprise:
receiving, from the user device, data indicative of a second potential issue from the one or more potential issues being a false positive;
determining, based on the second potential issue being a false positive, a second set of one or more rules for filtering the one or more potential issues;
sorting the second set of one or more rules in association with the first project identifier; and
automatically applying the second set of one or more rules to the scans associated with the first project identifier.

3. The code scanning service of claim 2, wherein the operations further comprise:
receiving data indicative of a user selection to apply the second set of one or more rules to code stored in a particular directory; and
automatically applying the second set of one or more rules to the code stored in the particular directory.

4. The code scanning service of claim 1, wherein the operations further comprise:
receiving, by the scanner website, a second code for analysis, the second code being associated with the first project identifier;
scanning the second code to identify a second list of one or more potential issues associated with the second code;
filtering the second list of the one or more potential issues based on the first set of one or more rules; and
providing the second list for display at a user device.

5. A method comprising:
receiving, by a first device, code for analysis, the code being associated with a first project identifier;
scanning the code to identify one or more potential issues associated with the code comprising:
determining a first geographic location associated with the code;
determining one or more error patterns associated with the first geographic location, wherein the one or more error patterns are associated with errors during code execution; and
identifying at least one portion of the code that match the one or more error patterns;
determining a list comprising, at least, the one or more potential issues for display at a user device, wherein the one or more potential issues includes the at least one portion;
receiving, by the first device, data indicative of a first potential issue from the one or more potential issues being a false positive based on, at least in part, user input;
determining, based at least in part on the first potential issue being a false positive, a first set of one or more rules for modifying the list;
sorting the first set of one or more rules in association with the first project identifier; and
automatically applying the first set of one or more rules to scans associated with the first project identifier.

6. The method of claim 5, wherein the first set of one or more rules comprises a first rule, wherein applying the first rule removes occurrences associated with the first potential issue from the list.

7. The method of claim 5, further comprising:
receiving data indicative of a second potential issue from the one or more potential issues being a false positive;
determining, based on the second potential issue being a false positive, a second set of one or more rules for modifying the list;
sorting the second set of one or more rules in association with the first project identifier; and
automatically applying the second set of one or more rules to the scans associated with the first project identifier.

8. The method of claim 7, further comprising:
receiving data indicative of a user selection to apply unified rules to projects associated with a user account identifier; and
automatically applying the second set of one or more rules to the scans associated with the user account identifier.

9. The method of claim 7, further comprising:
receiving a second code for analysis, the second code being associated with the first project identifier;
scanning the second code to identify a second list of one or more potential issues associated with the second code;
modifying the second list of the one or more potential issues based on the first set of one or more rules; and
providing the modified second list for display at a user device.

10. The method of claim 5, wherein determining a list comprising, at least, the one or more potential issues for display at a user device further comprises providing code that when executed at the user device causes display of a graphical user interface element displaying at least an identifier for an occurrence of a first potential issue in association with a first user input field for designating the occurrence of the first potential issue as a false positive.

11. The method of claim 10, wherein the graphical user interface element further comprises a second user input, associated with the occurrence of the first potential issue, for receiving a user selection to apply one or more rules, determined based on the occurrence of the first potential issue being designated as a false positive, to at least one of a first group of code and a second group of code, wherein the first group of code is associated with a first identifier and wherein the second group of code is associated with a second identifier.

12. The method of claim 11, wherein the database comprises one or more error patterns associated with the first geographic location and one or more error patterns associated with a second geographic location.

13. A system, comprising:
a data processing apparatus; and
a first memory in data communication with the data processing apparatus and storing instructions executable by the data processing apparatus that upon such execution cause the data processing apparatus to perform operations comprising:
receiving, by a first device, code for analysis, the code being associated with a first project identifier;
scanning the code to identify one or more potential issues associated with the code comprising:
determining a first geographic location associated with the code;
determining one or more error patterns associated with the first geographic location, wherein the one or more error patterns are associated with errors during code execution; and
identifying at least one portion of the code that match the one or more error patterns;

providing a list comprising, at least, the one or more potential issues for display at a user device, wherein the one or more potential issues includes the at least one portion;

receiving, by the first device, data indicative of a first potential issue from the one or more potential issues being a false positive based on, at least in part, user input;

determining, based at least in part on the first potential issue being a false positive, a first set of one or more rules for filtering the one or more potential issues;

sorting the first set of one or more rules in association with the first project identifier; and automatically applying the first set of one or more rules to scans associated with the first project identifier.

14. The system of claim 13, wherein the first set of one or more rules comprises a first rule, wherein applying the first rule removes occurrences associated with the first potential issue from the list.

15. The system of claim 13, wherein the operations further comprise:

receiving data indicative of a second potential issue from the one or more potential issues being a false positive;

determining, based on the second potential issue being a false positive, a second set of one or more rules for filtering the one or more potential issues;

sorting the second set of one or more rules in association with the first project identifier; and automatically applying the second set of one or more rules to the scans associated with the first project identifier.

16. The system of claim 15, wherein the operations further comprise:

receiving data indicative of a user selection to apply unified rules to projects associated with a user account identifier; and automatically applying the second set of one or more rules to the scans associated with the user account identifier.

17. The system of claim 15, wherein the operations further comprise:

receiving a second code for analysis, the second code being associated with the first project identifier;

scanning the second code to identify a second list of one or more potential issues associated with the second code;

filtering the second list of the one or more potential issues based on the first set of one or more rules; and providing the second list for display at a user device.

18. The system of claim 13, wherein providing a list comprising, at least, the one or more potential issues for display at a user device further comprises providing code that when executed at the user device causes display of a graphical user interface element displaying at least an identifier for an occurrence of a first potential issue in association with a first user input field for designating the occurrence of the first potential issue as a false positive, wherein the graphical user interface element further comprises a second user input, associated with the occurrence of the first potential issue, for receiving a user selection to apply one or more rules, determined based on the occurrence of the first potential issue being designated as a false positive, to at least one of a first group of code and a second group of code.

19. The system of claim 18, wherein the operations further comprise:

receiving, by the first device, data requesting that potential issues of a same type as the first potential issue be ignored during future scans, wherein the potential issues of the same type as the first potential issue comprise a second potential issue that is associated with a second code pattern;

performing a second scan of second code, wherein the scan ignores identifying the second code pattern.

20. The system of claim 19, wherein the first group of code is associated with the first project identifier and wherein the second group of code is associated with an account identifier.

* * * * *